(12) United States Patent
Furman et al.

(10) Patent No.: US 11,562,746 B2
(45) Date of Patent: Jan. 24, 2023

(54) SYSTEM AND METHODS FOR SPEAKER IDENTIFICATION, MESSAGE COMPRESSION AND/OR MESSAGE REPLAY IN A COMMUNICATIONS ENVIRONMENT

(71) Applicant: Harris Global Communications, Inc., Rochester, NY (US)

(72) Inventors: William N. Furman, Fairport, NY (US); John W. Nieto, Rochester, NY (US); William M. Batts, West Henrietta, NY (US); Michael T. Kurdziel, Rochester, NY (US)

(73) Assignee: Harris Global Communications, Inc., Rochester, NY (US)

( * ) Notice: Subject to any disclaimer, the term of this patent is extended or adjusted under 35 U.S.C. 154(b) by 361 days.

(21) Appl. No.: 16/875,266

(22) Filed: May 15, 2020

(65) Prior Publication Data
US 2021/0358501 A1 Nov. 18, 2021

(51) Int. Cl.
*G06F 17/00* (2019.01)
*G10L 15/26* (2006.01)
(Continued)

(52) U.S. Cl.
CPC .............. *G10L 15/26* (2013.01); *G06F 3/165* (2013.01); *H04L 9/3247* (2013.01);
(Continued)

(58) Field of Classification Search
CPC ......... G10L 15/26; G10L 17/00; G06F 3/165; G06F 21/32; G06F 21/64; H04L 9/3242;
(Continued)

(56) References Cited

U.S. PATENT DOCUMENTS 4,618,998 A 10/1986 Kawamura
4,979,204 A 12/1990 Oyama
(Continued)

FOREIGN PATENT DOCUMENTS

EP 3109857 A1 12/2016

OTHER PUBLICATIONS

European Search Report issued in European Patent Application No. 21172983.5 dated Sep. 30, 2021.

*Primary Examiner* — Paul C McCord
(74) *Attorney, Agent, or Firm* — Fox Rothschild LLP; Robert J. Sacco; Carol E. Thorstad-Forsyth

(57) ABSTRACT

Systems (100) and methods (800) for communicating information. The methods comprise: storing message sets in Communication Devices ("CDs") so as to be respectively associated with speaker information; performing operations, by a first CD, to capture an audio message spoken by an individual and to convert the audio message into a message audio file; comparing the message audio file to each reference audio file in the message sets to determine whether one of the reference audio files matches the message audio file by a certain amount; converting the audio message into a text message when a determination is made that a reference audio file does match the message audio file by a certain amount; generating a secure text message by appending the speaker information that is associated with the matching reference audio file to the text message, or by appending other information to the text message; transmitting the secure text message.

24 Claims, 5 Drawing Sheets

(51) Int. Cl.
  *H04W 76/30* (2018.01)
  *G06F 3/16* (2006.01)
  *H04L 9/32* (2006.01)
  *H04L 9/40* (2022.01)
  *H04S 7/00* (2006.01)
  *H04W 4/14* (2009.01)

(52) U.S. Cl.
  CPC .......... *H04L 63/123* (2013.01); *H04L 63/126* (2013.01); *H04S 7/301* (2013.01); *H04S 7/302* (2013.01); *H04W 4/14* (2013.01); *H04W 76/30* (2018.02)

(58) Field of Classification Search
  CPC . H04L 9/3247; H04L 63/0861; H04L 63/123; H04L 63/126; H04S 7/301; H04S 7/302; H04W 4/14; H04W 12/069; H04W 12/108; H04W 76/30
  USPC .......................................................... 700/94
  See application file for complete search history.

(56) References Cited

U.S. PATENT DOCUMENTS

| | | | |
|---|---|---|---|
| 5,172,414 | A | 12/1992 | Reeds, III et al. |
| 8,291,028 | B2 | 10/2012 | Lasensky et al. |
| 8,583,431 | B2 | 11/2013 | Furman et al. |
| 10,506,388 | B1 | 12/2019 | Furman et al. |
| 10,957,318 | B2* | 3/2021 | Mishra ..................... G10L 15/30 |
| 11,133,026 | B2* | 9/2021 | Gordon ................ A61B 5/7267 |
| 2014/0142939 | A1* | 5/2014 | Aradi ..................... G16H 15/00 704/235 |
| 2015/0350321 | A1* | 12/2015 | Klose ..................... H04L 51/18 709/217 |
| 2016/0316367 | A1* | 10/2016 | Rose ..................... H04B 5/0056 |
| 2018/0205726 | A1* | 7/2018 | Chari ................... H04L 63/0861 |
| 2018/0309581 | A1 | 10/2018 | Butler et al. |
| 2019/0243956 | A1* | 8/2019 | Sheets ................. H04L 63/0861 |
| 2020/0084047 | A1* | 3/2020 | Butler ................... H04L 9/3231 |
| 2021/0117553 | A1* | 4/2021 | Shpurov .................. H04L 9/008 |

* cited by examiner

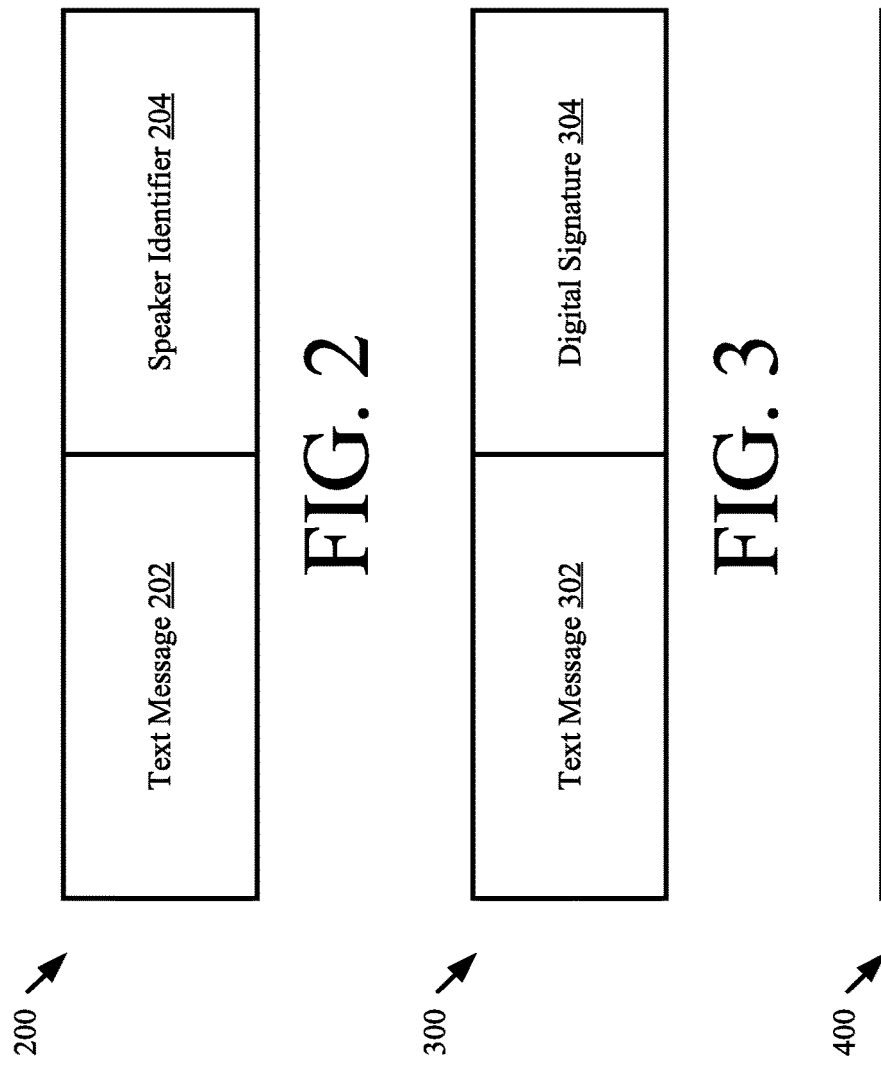

From FIG. 8A
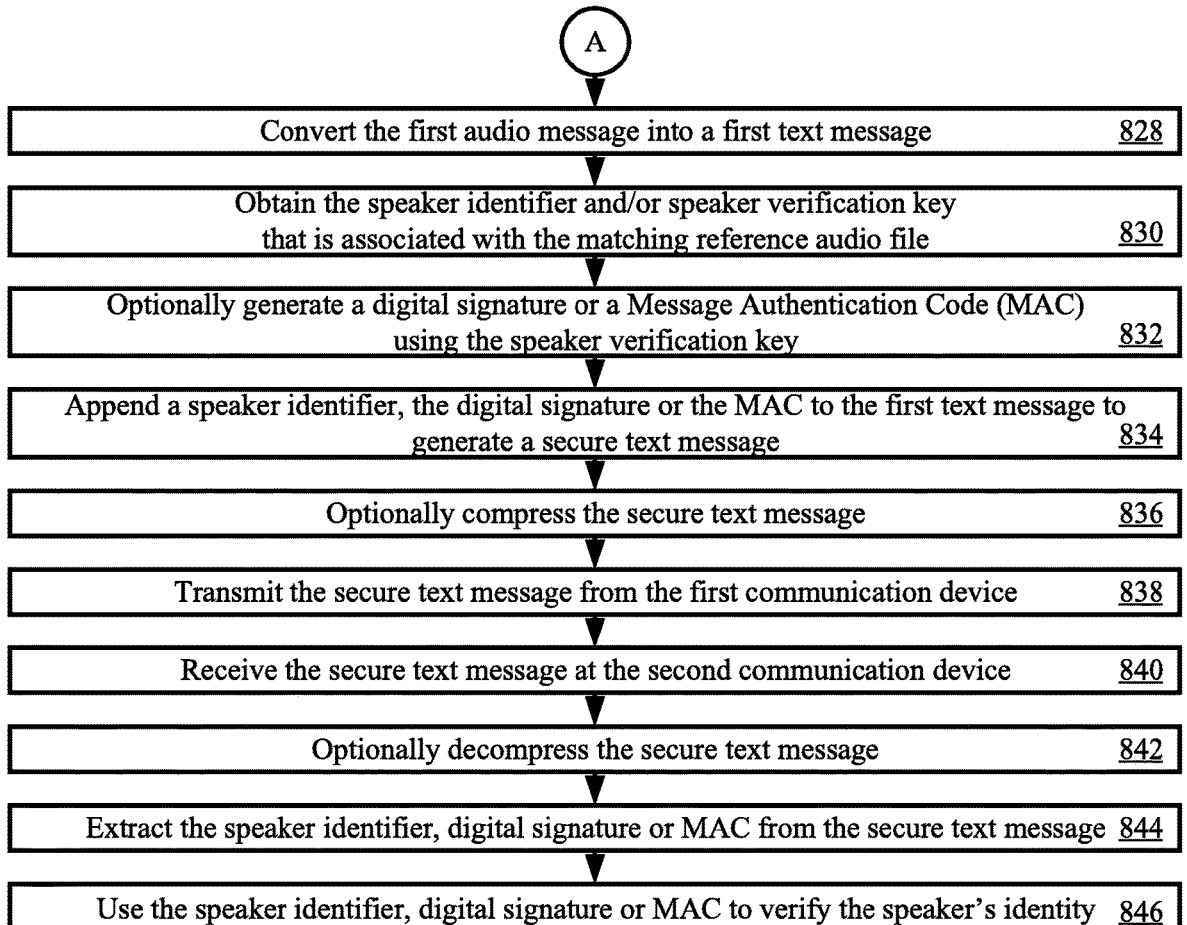
FIG. 8B
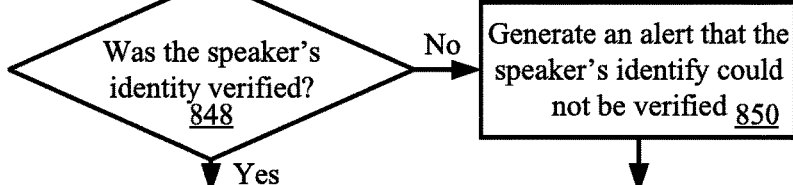
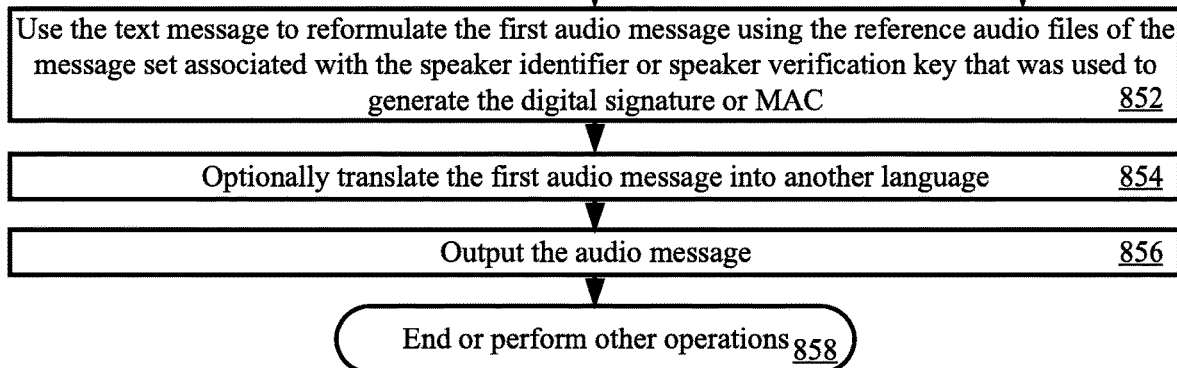

SYSTEM AND METHODS FOR SPEAKER IDENTIFICATION, MESSAGE COMPRESSION AND/OR MESSAGE REPLAY IN A COMMUNICATIONS ENVIRONMENT

FIELD

This document relates generally to communication systems. More particularly, this document relates to systems and methods for speaker identification, message compression and/or message replay in a communications environment.

BACKGROUND

One kind of communications network is a tactical data network or a tactical communications network that may be utilized by units within an organization such as a military (e.g., army, navy, and/or air force) for communicating data such as text, voice, position telemetry, sensor data, and/or real-time video. Nodes within a tactical data network may include, for example, individual soldier handheld radios, aircraft radios, mobile command units, satellites, and/or fixed radios. The nodes transmit and receive voice signals. Analog speech is converted into digital speech at a transmitting node using low rate voice encoders. The digital speech is then transmitted to a receiving node. The receiving node uses low rate voice encoders to convert the digital speech back to analog speech. This digital-speech based communication can obscure speaker identification needed for voice recognition (i.e., low rate voice encoders trade voice quality for lower number of bits required to represent voice). The analog speech may alternatively be converted into text, and transmitted to the receiving node via a Short Message Service ("SMS") based communication. The SMS based communication provides no sender validation through audio queues that a particular person is speaking.

SUMMARY

The present disclosure concerns implementing systems and methods for communicating information between a plurality of communication devices. The methods comprise storing a plurality of message sets in local memories of the plurality of communication devices so as to be respectively associated with speaker information (e.g., a speaker identifier and a speaker verification key). Each of the message sets comprises a plurality of reference audio files including audio data for words or phrases spoken by a given individual of a plurality of individuals using the communication devices. A first communication device performs operations to: capture an audio message spoken by a first individual of the plurality of individuals; convert the audio message into a message audio file; compare the message audio file to each reference audio file in the plurality of message sets to determine whether one of the plurality of reference audio files matches the message audio file by a certain amount; convert the audio message into a text message when a determination is made that a reference audio file of the plurality of reference audio files does match the message audio file by a certain amount; generate a secure text message by appending the speaker information that is associated with the matching reference audio file to the text message, or by appending other information generated using the speaker information that is associated with the matching reference audio file to the text message; optionally compress the secure text message; and/or transmit the secure text message from the first communication device. The other information may include, but is not limited to, a digital signature or a media authentication code that is generated by the first communication device using a speaker verification key. The message audio file, either encoded by a digital voice algorithm "vocoder", or directly as analog voice may be transmitted along with the secure text message from the first communication device.

In some scenarios, the methods also comprise: performing operations by the first communication device to prevent transmission of the audio message when a determination is made that none of the plurality of reference audio files matches the message audio file by a certain amount; and/or performing operations by the first communication device to output a notification that transmission of the audio message is prevented.

In those or other scenarios, the methods also comprise: receiving the secure text message at a second communication device of the plurality of communication devices; extracting the speaker information and/or the other information from the secure text message; and using the extracted speaker information and/or other information to verify an identity of the first individual. The first individual's identity may be verified by: comparing the speaker information to the speaker information stored in the local memory of the second communication device so as to be associated with the message sets; and/or determining whether the speaker information used to generate the other information matches the speaker information stored in the local memory of the second communication device so as to be associated with the message sets.

The methods may further comprise generating and outputting an alert from the second communication device when the first individual's identity is not verified; and/or using one of the message sets to reformulate the audio message when the first individual's identity is verified or is not verified.

DESCRIPTION OF THE DRAWINGS

Embodiments will be described with reference to the following drawing figures, in which like numerals represent like items throughout the figures.

FIGS. 2-7 each provide an illustration of an illustrative message structure.

FIGS. 8A-8B (collectively referred to herein as "FIG. 8") provide a flow diagram of an illustration method for providing improved speaker identification in a communications system.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Tactical communications equipment can be complex to use. Users need a simple interface to help manage and navigate the use of these systems. Enhanced speech technology can improve the ease of use. Speaker recognition and identification is an important component of reliable communication, especially in tactical applications.

Figure 1:
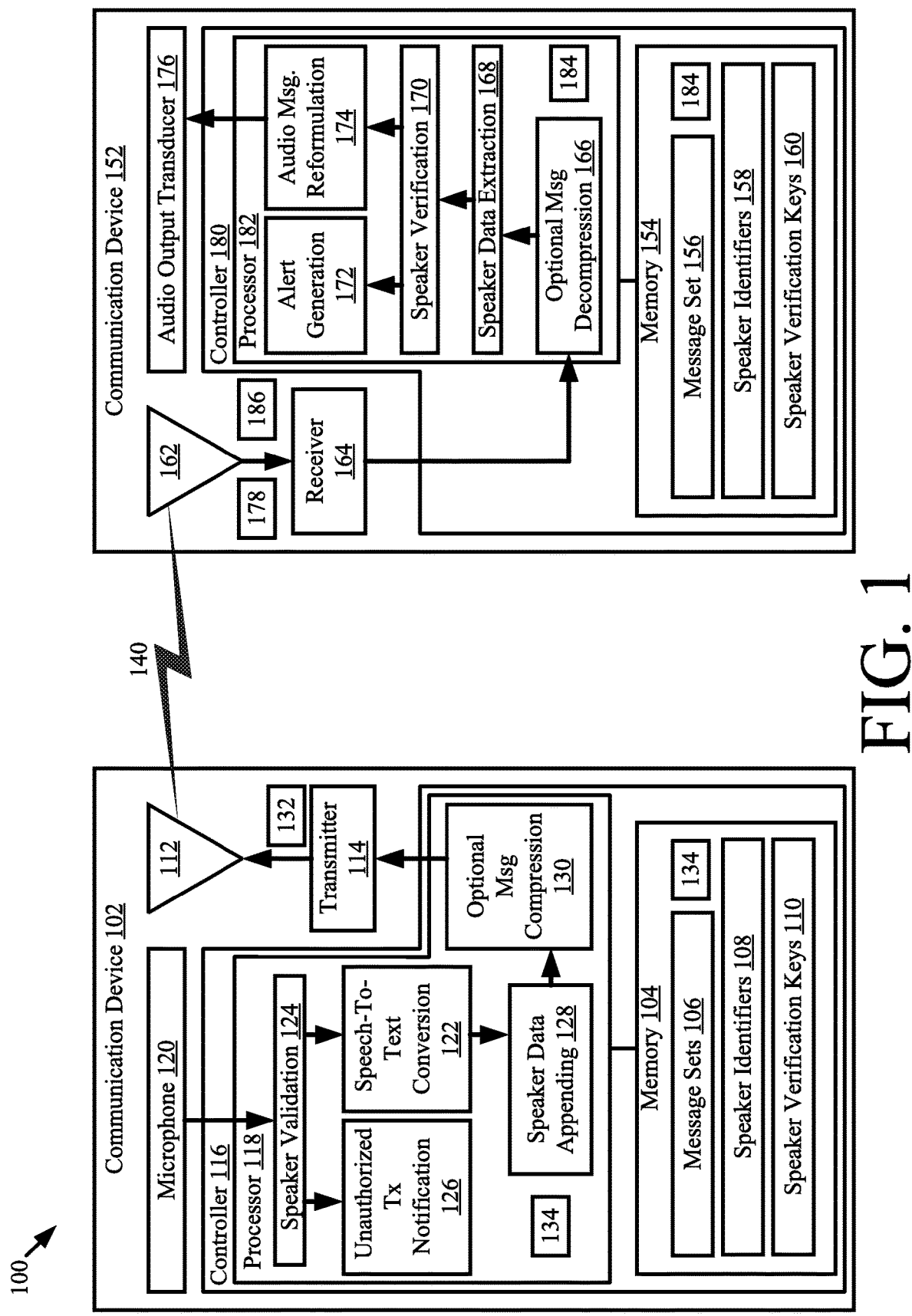
FIG. 1 is an illustration of an illustrative system implementing the present solution.

Referring now to FIG. 1, there is provided an illustration of an illustrative system 100 that implements the present solution. System 100 is generally configured to provide improved speaker identification in relation to data communications between a plurality of communication devices. The manner in which the improved speaker identification is achieved will become evident as the discussion progresses.

As shown in FIG. 1, system 100 comprises two communication devices 102, 152 that are able to exchange electronic messages with each other over a data communication network. Although only two communication devices are shown in FIG. 1, the present solution is not limited in this regard. System 100 can include any number of communication devices selected in accordance with a given application. The communication devices 102, 152 can include, but are not limited to, radios, transmitters, mobile devices, receivers, workstations, and/or other communication devices. The data communication network can include, but is not limited to, the Internet, a radio network, a cellular network, a Local Area Network ("LAN"), a Wide Area Network ("WAN"), or the like.

Each communication device 102, 152 comprises an internal memory 104, 154 with various information stored therein. This stored information includes, but is not limited to, message sets 106, 156, speaker identifiers 108, 158, and/or speaker verification keys 110, 160. Each user of a communication device in system 100 is assigned a speaker identifier and/or a speaker verification key. For example, a first individual is using communication device 102, while a second individual is using communication device 152. A first speaker identifier and/or first speaker verification key is assigned to the first individual, and a second different speaker identifier and/or second different speaker verification key is assigned to the second individual. The first and second speaker identifiers and speaker verification keys are stored locally by both communication devices 102, 152. Each of the first and second speaker identifiers can include a unique sequence of numbers, letters, and/or symbols. Each of the first and second speaker verification keys can include, but is not limited to, a private key that facilitates generation of a digital signature or a symmetric key that facilitates generation of a Message Authentication Code ("MAC"). Private keys, symmetric keys, digital signatures, and MACs are well known in the art, and therefore will not be described here. In some scenarios, the digital signatures are generated in accordance with a Rivest Shamir Adleman ("RSA") based signature scheme or a Digital Signature Algorithm ("DSA") based signature scheme. The MACs may be generated using a MAC function similar to a cryptographic hash function. The MACs differ from the digital signatures as the MACs are both generated and verified using the same secret key.

Each message set comprises a plurality of reference audio files storing digital audio data for words and/or phrases spoken by a respective individual that were captured by a communication device. For example, a first message set comprises audio files for words and/or phrases that were spoken by the first individual and captured by a microphone 120 of the first communication device 102. Likewise, a second message set comprises audio files for words and/or phrases that were spoken by the second individual and captured by a microphone 178 of the second communication device 152. The first message set is stored in memories 104, 154 of the communication devices 102, 152 so as to be associated with the first speaker identifier and/or the first speaker verification key. Similarly, the second message set is stored in memories 104, 154 of the communication devices 102, 152 so as to be associated with the second speaker identifier and/or the second speaker verification key. In this case, the message sets 104, 156 comprise the same speaker information. The present solution is not limited in this regard. Notably, the message sets can be generated and stored prior to or after the communication devices 102, 152 are deployed in the field. Accordingly, the message sets 104, 156 can be loaded onto each communication device via a wired link or a wireless link.

While in the field, a user speaks into the microphone 120 of communication device 102. The microphone 120 captures an audio message as an analog audio signal and converts the same to a digital audio signal. The digital audio signal is then passed to a controller 116 of the communication device 102.

The controller 116 includes a processor 118 (e.g., a Central Processing Unit ("CPU")) and memory 104. Memory 104 stores one or more sets of instructions 134 (e.g., software code). The instructions 134 implement one or more of the methodologies, procedures, or functions described herein. The instructions 134 can also reside, completely or at least partially, within processor 118 during execution thereof thereby. Memory 104 and the processor 118 can constitute machine-readable media. The instructions 134 cause the processor 118 to perform various functions. These functions include speaker validation 124, unauthorized transmit notification 126, speech-to-text conversion 122, speaker data appending 128, and optional message compression 130.

The speaker validation function 124 involves converting the digital audio signal to a message audio file. Techniques for converting digital audio signals to a message audio file are well known in the art, and therefore will not be described here. The message audio file is analyzed to validate the actual speaker (e.g., Tom said "Meet me at the wagon wheel"). In this regard, the spoken message message is compared to the pre-recorded audio messages of each reference audio file in the message sets 106 to identify which reference audio file matches (by a certain amount or degree, e.g., ≥75%) the message audio file.

The speech-to-text conversion function 122 involves converting the audio message of the message audio file into a text message. Techniques for converting (i) digital audio signals to a message audio file and (ii) audio messages into text messages are well known in the art, and therefore will not be described here. One such speech-to-text conversion method that can be employed here is described in U.S. Pat. No. 8,583,431 to Furman et al. The text message is then analyzed to identify the actual word or phrase spoken by the individual (e.g., "Meet me at the wagon wheel"). In this regard, the text message is compared to pre-stored reference text messages of each reference audio file in the message sets 106.

In some scenarios, the speech-to-text conversion operations of block 122 can additionally or comprises vocoder operations and/or data compression operations. The output of the text-to-speech operations, the vocoder and/or data compression can be passed to block 128.

In FIG. 1, speaker validator operations 124 are shown as occurring before speech-to-text conversion operation 122. The present solution is not limited in this regard. In some alternative scenarios, the speech-to-text conversion operations 122 occur before or at the same time as the speaker validator operations 124.

If none of the reference audio files matches the message audio file, then the unauthorized transmit notification function 126 may be performed so as to cause the communication device 104 to generate and output a notification that transmission of the audio message is not permitted. The notification can include a tactile notification (e.g., a vibration generated by a vibrating device of I/O components 132), an auditory notification (e.g., a beep or alarm sound output from a speaker of I/O components 132), and/or a visual notification (e.g., text displayed on a display screen of I/O components 132). After outputting the notification, the communication device 102 may discard the audio message, or cause the audio message to be stored locally or in a remote datastore (not shown in FIG. 1) (e.g., a database).

If one of the reference audio files matches the message audio file, then the speaker data appending function 128 are performed. The speaker data appending function 128 involves appending a speaker identifier, a digital signature, and/or a MAC to the text message. Illustrations are provided in FIG. 2 and FIG. 5 that show speaker identifiers 204, 506 appended to text messages 202, 504. Illustrations are provided in FIG. 3 and FIG. 6 that show digital signatures 304, 606 appended to text messages 302, 604. Illustration are provided in FIG. 4 and FIG. 7 that show MACs appended to text messages 402, 704. Methods for generating digital signatures and MACs are well known in the art, and therefore will not be described herein. Any known or to be known method for generating digital signatures and/or MACs can be used here. For example, a hash algorithm can be used here to generate a hash of the text message. A private key assigned to a given individual is then used to encrypt the hash. The encrypted hash is the digital signature. The digital signature can include any number of bits selected in accordance with a given application (e.g., 240 bits). Alternatively, an encryption algorithm is used to generate a sequence of symbols using the text message and a symmetric encryption key. The sequence of symbols is the MAC. The MAC can include any number of bits selected in accordance with a given application (e.g., 128 bits). The present solution is not limited to the particulars of this example.

In some scenarios, the text message is compressed by the processor 118 via the optional message compression function 130. Techniques for compressing messages are well known in the art, and therefore will not be described here. One such technique for compressing messages that can be employed here is described in U.S. Pat. No. 10,506,388 to Furman et al.

Figure 5:
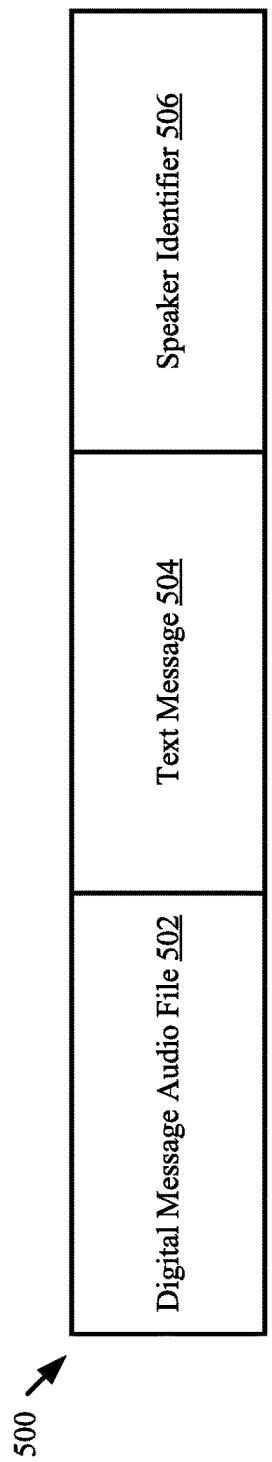
Figure 6:
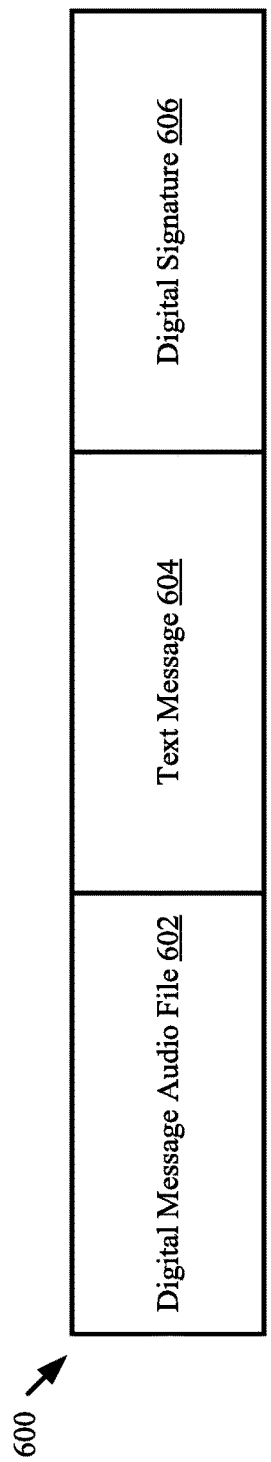
Figure 7:
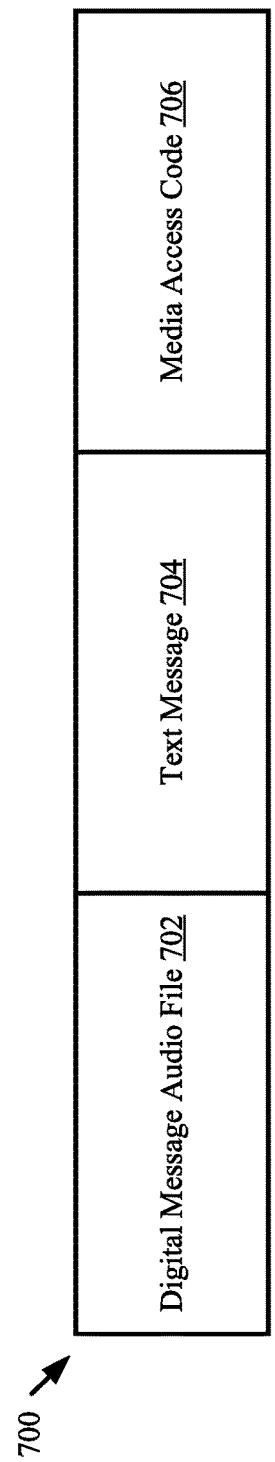

The text message with the appended speaker data is then provided to transmitter 114 and transmitted over a communication link 140 via antenna 112. In some scenarios, the digital audio file (e.g., digital audio file 502 of FIG. 5, 602 of FIG. 6, or 702 of FIG. 7) is also transmitted along with the text message as shown by FIGS. 5-7. The text message, speaker data and/or digital audio file is received at communication device 152 via antenna 162 and receiver 164. Transmitters, receivers and antennas are well known in the art, and therefore will not be described here.

At the communication device 152, the text message is passed from receiver 164 to controller 180. Controller 180 comprises a processor 182 (e.g., a Central Processing Unit ("CPU")) and memory 154. Memory 154 stores one or more sets of instructions 184 (e.g., software code). The instructions 184 implement one or more of the methodologies, procedures, or functions described herein. The instructions 184 can also reside, completely or at least partially, within processor 182 during execution thereof thereby. Memory 154 and the processor 182 can constitute machine-readable media. The instructions 184 cause the processor 182 to perform various functions for processing the text message. These functions include optional message decompression 166, speaker data extraction 168, speaker verification 170, alert generation 172, and audio message reformatting 174.

In some scenarios, the text message is decompressed via the message decompression function 166. Methods for decompressing messages are well known in the art, and therefore will not be described here. One such technique for decompressing messages that can be employed here is described in U.S. Pat. No. 10,506,388 to Furman et al.

The speaker data extraction function 168 involves extracting the speaker data from the text message. The speaker data can include, but is not limited to, the speaker identifier (e.g., speaker identifier 204 of FIG. 2 or 506 of FIG. 5), the digital signature (e.g., digital signature 304 of FIG. 3 or 606 of FIG. 6), and/or MAC (e.g., MAC 404 of FIG. 4 or 706 of FIG. 7).

Once the speaker data has been extracted from the text message, it is used to verify the speaker's identity in 170. For example, in some scenarios, the speaker's identity is verified by comparing the speaker identifier 204, 506 to a plurality of speaker identifiers 158 stored in memory 154 of computing device 152. If one of the stored speaker identifiers matches the extracted speaker identifier, then the speaker's identity is verified. In other scenarios, the speaker's identity is verified by determining if a speaker verification key 160 stored in memory 154 of computing device 152 matches a speaker verification key used to generate the digital signature 304, 606 or MAC 404, 706. The speaker's identity is verified when a locally stored speaker verification key is determined to match the speaker verification key used to generate the digital signature or MAC. The present solution is not limited to the particulars of these example.

If the speaker's identity was not verified, then alert generation function 172 is performed by processor 182. The alert is generated to notify the user of computing device 152 that the speaker's identity could not be verified. The alert can be a tactile alert (e.g., a vibration generated by a vibrating device of I/O components 186), an auditory alert (e.g., a beep or other sound output from the audio output transducer 176), and/or a visual alert (e.g., an icon, text message or other media displayed on a display screen of I/O components 186).

If the speaker's identity was verified, then the processor 182 performs the audio message reformulation function 172 to reformulate the audio message. The audio message is reformulated using the reference audio files of the message set 156 that is associated with the speaker identifier or speaker verification key assigned to the speaker with the verified identity. For example, a reference audio file is obtained in which the word(s)/phrase(s) of the text message are spoken by the speaker with the verified identity. The spoken word(s)/phrase(s) are then arranged in the same order as they appear in the text message so as to generate a reformulated first audio message. In some scenarios, the reformulated audio message is optionally translated into another language. Techniques for translating audio message from a first language to a second different language are well known in the art, and therefore will not be used here. Any known or to be known technique for language translation can be used herein. The reformulated audio message is then output from the audio output transducer 176 of communication device 152.

Figure 8A:
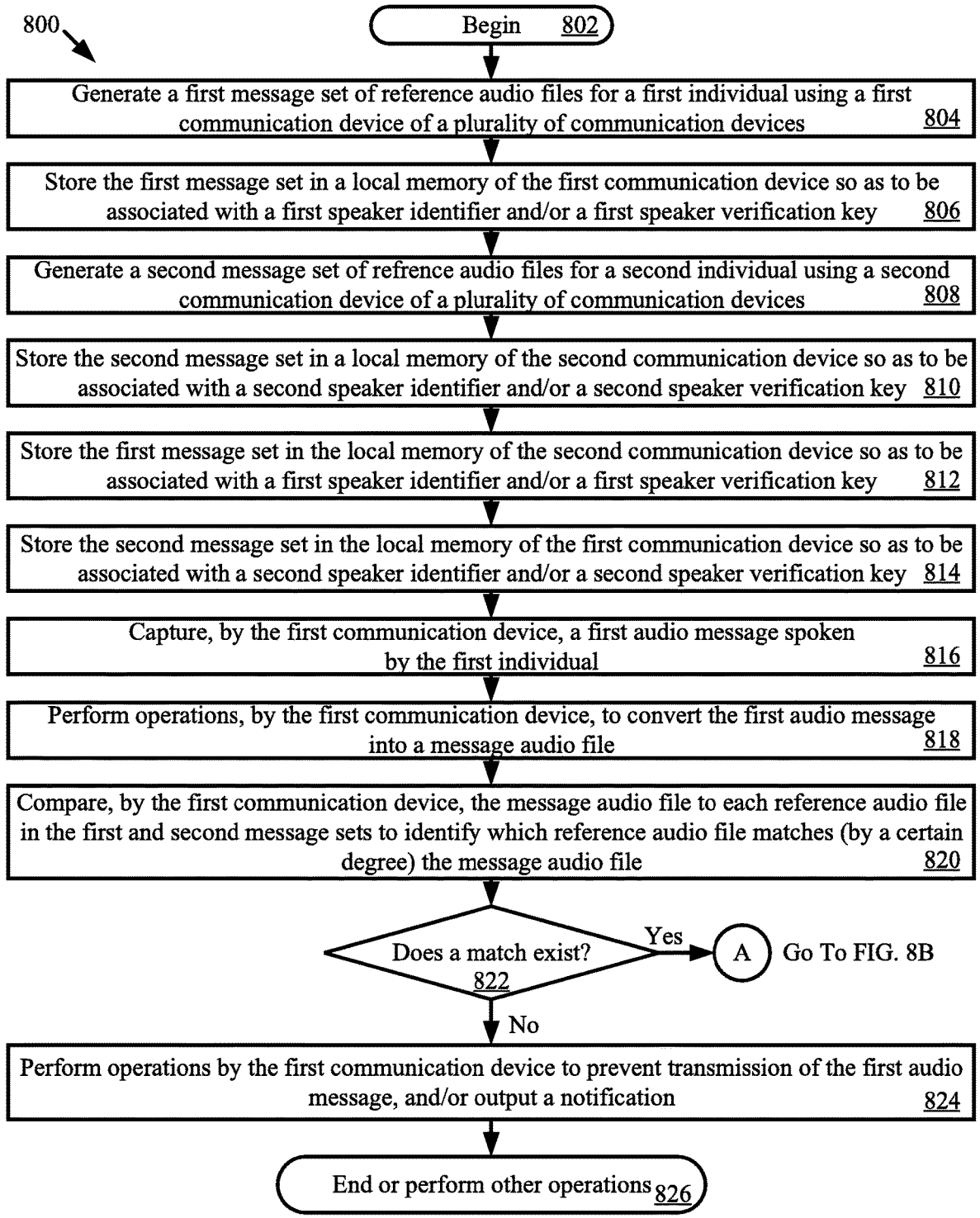

Referring now to FIG. 8, there is provided a flow diagram of an illustrative method 800 for providing improved speaker identification in a communications system. Method 800 begins with 802 and continues with 804 where a first message set is generated for a first individual using a first communication device (e.g. communication device 102 of FIG. 1) of a plurality of communication devices. The first message set comprises a plurality of reference audio files storing digital audio data for words and/or phrases spoken by the first individual that were captured by a microphone of the first communication device. The first message set is stored in a local memory (e.g., memory 104 of FIG. 1) of the first communication device so as to be associated with a first speaker identifier and/or a first speaker verification key, as shown by 806.

In 808, a second message set is generated for a second individual using a second communication device (e.g. communication device 152 of FIG. 1) of the plurality of communication devices. The second message set comprises a plurality of reference audio files storing digital audio data for words and/or phrases spoken by the second individual that were captured by a microphone of the second communication device. The second message set is stored in a local memory (e.g., memory 154 of FIG. 1) of the second computing device so as to be associated with a second speaker identifier and/or a second speaker verification key, as shown by 810.

In 812, the first message set is also stored in the local memory of the second communication device so as to be associated with the first speaker identifier and/or first speaker verification key. In 814, the second message set is also stored in the local memory of the first communication device so as to be associated with the second speaker identifier and/or second speaker verification key. The operations of 804-814 may be performed prior to or after the communication devices are deployed to the field.

While in the field, the first communication device captures a first audio message spoken by the first individual as shown by 816. The first communication device then performs operations in 818 to convert the first audio message into a message audio file. Methods for converting an audio message into an audio file are well known in the art, and therefore will not be described here. Any known technique for converting an audio message into an audio file can be used here.

In 820, the first communication device compares the message audio file to each reference audio file in the first and second message sets to identify which reference audio file matches (e.g., by a certain degree such as 75%) the message audio file. If a match does not exist [822:NO], then method 800 continues with 824 where the first communication device prevents transmission of the first audio message and/or outputs a notification. The notification can include a tactile notification (e.g., a vibration), an auditory notification (e.g., a beep or alarm sound), and/or a visual notification (e.g., text displayed on a display screen). Subsequently, 826 is performed where method 800 ends or other operations are performed (e.g., return to 816).

In contrast, if a match does exist [822:YES], method 800 continues with 828 of FIG. 8B. As shown in FIG. 8B, 828 involves converting the first audio message into a first text message. Techniques for converting audio messages into text messages are well known in the art, and therefore will not be described here. One such speech-to-text conversion method that can be employed here is described in U.S. Pat. No. 8,583,431 to Furman et al.

The first computing device obtains in 830 the speaker identifier and/or the speaker verification key that is associated with the matching reference audio file (e.g., the first speaker identifier and/or the first speaker verification key). In the scenario where a speaker verification key is employed, a digital signature or a MAC is generated as shown by optional 832. Techniques for generating digital signatures and MACs using keys are well known in the art, and therefore will not be discussed here. For example, a hash algorithm can be used here to generate a hash of the text message. A private key assigned to the first individual is then used to encrypt the hash. The encrypted hash is the digital signature. The digital signature can include any number of bits selected in accordance with a given application (e.g., ≥240 bits). Alternatively, an encryption algorithm is used to generate a sequence of symbols using the text message and a symmetric encryption key. The sequence of symbols is the MAC. The MAC can include any number of bits selected in accordance with a given application (e.g., 128 bits). The present solution is not limited to the particulars of this example.

In 834, speaker data is appended to the first text message to generate a secure text message. The speaker data includes, but is not limited to, the speaker identifier, the digital signature, and/or the MAC. The secure text message is optionally compressed in 836. Techniques for compressing messages are well known in the art, and therefore will not be described here. One such technique for compressing messages that can be employed here is described in U.S. Pat. No. 10,506,388 to Furman et al.

The secure text message is then transmitted from the first communication device in 838. This transmission can be achieved in accordance with an RF wireless text massaging transmission scheme as discussed above in relation to FIGS. 2-4 or in accordance with a digital voice transmission scheme as discussed above in relation to FIGS. 5-7.

In 840, the secure text message is received at the second communication device (e.g., communication device 152 of FIG. 1). The second communication device may optionally decompress the secure text message as shown by 842. In 844, the second communication device extracts the speaker identifier, digital signature or MAC from the secure text message. The extracted information is used in 846 to verify the speaker's identity. For example, in some scenarios, the speaker's identity is verified by comparing the speaker identifier to a plurality of speaker identifiers stored in a local memory (e.g., memory 154 of FIG. 1) of the second computing device. If one of the stored speaker identifiers matches the extracted speaker identifier, then the speaker's identity is verified. In other scenarios, the speaker's identity is verified by determining if a speaker verification key stored in a local memory of the second computing device matches a speaker verification key used to generate the digital signature or MAC. The speaker's identity is verified when a locally stored speaker verification key is determined to match the speaker verification key used to generate the digital signature or MAC. The present solution is not limited to the particulars of these examples.

If the speaker's identity was not verified [848:NO], then method 800 continues with 850 where an alert is generated by an alert generator (e.g., alert generator 172 of FIG. 1) of the second computing device. The alert is generated to notify the user of the second computing device that the speaker's identity could not be verified. The alert can be a tactile alert, an auditory alert, and/or a visual alert. Thereafter, 852 is performed which will be discussed below.

If the speaker's identity was verified [848:YES], then method 800 continues with 852 where the text message is used by an audio message reformulator (e.g., audio message reformulator 174 of FIG. 1) of the second computing device to reformulate the first audio message. The first audio message is reformulated using the reference audio files of the message set (e.g., the first message set) that is associated with the speaker identifier or speaker verification key assigned to the speaker with the verified identity. For example, a reference audio file is obtained in which the word(s)/phrase(s) of the text message are spoken by the speaker with the verified identity. The spoken word(s)/phrase(s) are then arranged in the same order as they appear in the text message so as to generate a reformulated first audio message. In some scenarios, the reformulated audio message is optionally translated into another language as shown by 854. Techniques for translating audio messages from a first language to a second different language are well known in the art, and therefore will not be used here. Any known or to be known technique for language translation can be used herein. In some scenarios, the language translation may also occur on the authenticated text message, before audio reformulation. In this case, there may possibly be no reformulated audio from any stored audio, but may be machine generated text to speech audio. The reformulated first audio message is then output from an audio output transducer (e.g., audio output transducer 176 of FIG. 1) of the second communication device. Subsequently, 858 is performed where method 800 ends or other processing is performed (e.g., return to 816 of FIG. 8A).

As evident from the above discussion, the present solution provides recognizable speech and a robust communication method. For example, the phrase "meet me at the bridge" is approximately 2 seconds long. As such, 4800 bits of information is required to transmit the phrase over a network when employing a 2400 bps vocoder. In contrast, the phrase can be conveyed in a significantly less number of bits when the present solution is employed. Also, the speaker of the phrase is identifiable by a user of the receiving communication device when the present solution is employed. This is not necessarily the case within the 2400 bps vocoder scenario.

The present solution has many novel aspects. For example, the present solution uses a stand-alone (non-Internet/non-cloud) speech recognition technique and text-to-speech conversion process in a tactical environment. The present solution also employs a pre-recorded, pre-loaded tactical message library, which is used for speaker identification, short message compression and message replay at the receiving device. The present solution can send short tactical messages with a minimal number of bits maintaining speaker identification.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

We claim:

1. A method for communicating information between a plurality of communication devices, comprising:

storing a plurality of message sets in local memories of the plurality of communication devices so as to be respectively associated with speaker information and such that the plurality of message sets can subsequently be used to facilitate voice communications between a plurality of individuals that are using the plurality of communication devices, each said message set comprising a plurality of reference audio files including audio data for words or phrases that were spoken by a respective individual of the plurality of individuals;

performing operations, by a first communication device of the plurality of communication devices, to capture an audio message spoken by a first individual of the plurality of individuals and to convert the audio message into a message audio file;

comparing the message audio file to each said reference audio file in the plurality of message sets to determine whether one of the plurality of reference audio files at least partially matches the message audio file;

converting the audio message into a text message when a determination is made that a reference audio file of the plurality of reference audio files does at least partially match the message audio file;

generating a secure text message by appending the speaker information that is associated with the matching reference audio file to the text message, or by appending other information generated using the speaker information that is associated with the matching reference audio file to the text message;

transmitting the secure text message from the first communication device.

2. The method according to claim 1, further comprising performing operations by the first communication device to prevent transmission of the audio message when a determination is made that none of the plurality of reference audio files matches the message audio file by a certain amount.

3. The method according to claim 2, further comprising performing operations by the first communication device to output a notification that transmission of the audio message is prevented.

4. The method according to claim 1, wherein the speaker information comprises at least one of speaker identifiers and a speaker verification key.

5. The method according to claim 4, wherein the other information includes a digital signature or a media authentication code that is generated by the first communication device using the speaker verification key.

6. The method according to claim 1, further comprising compressing the secure text message prior to being transmitted from the first communication device.

7. The method according to claim 1, further comprising transmitting the message audio file along with the secure text message.

8. The method according to claim 1, further comprising:
receiving the secure text message at a second communication device of the plurality of communication devices;
extracting the speaker information or the other information from the secure text message; and
using the extracted speaker information or other information to verify an identity of the first individual.

9. The method according to claim 8, wherein the first individual's identity is verified by comparing the speaker information to the speaker information stored in the local memory of the second communication device so as to be associated with the message sets.

10. The method according to claim 8, wherein the first individual's identity is verified by determining whether the speaker information used to generate the other information matches the speaker information stored in the local memory of the second communication device so as to be associated with the message sets.

11. The method according to claim 8, further comprising generating and outputting an alert from the second communication device when the first individual's identity is not verified.

12. The method according to claim 8, further comprising using one of the message sets to reformulate the audio message.

13. A system, comprising:
a first communication device comprising:
a local memory in which a plurality of message sets are stored so as to be respectively associated with speaker information and such that the plurality of message sets can subsequently be used to facilitate voice communications between a plurality of individuals that are using the plurality of communication devices, each said message set comprising a plurality of reference audio files including audio data for words or phrases that were spoken by a respective individual of the plurality of individuals;
a microphone configured to capture an audio message spoken by a first individual of the plurality of individuals; and a processor configured to
convert the audio message into a message audio file,
compare the message audio file to each said reference audio file in the plurality of message sets to determine whether one of the plurality of reference audio files at least partially matches the message audio file,
convert the audio message into a text message when a determination is made that a reference audio file of the plurality of reference audio files does at least partially match the message audio file,
generate a secure text message by appending the speaker information that is associated with the matching reference audio file to the text message, or by appending other information generated using the speaker information that is associated with the matching reference audio file to the text message; and
a transmitter configured to transmit the secure text message.

14. The system according to claim 13, wherein the processor is further configured to prevent transmission of the audio message when a determination is made that none of the plurality of reference audio files matches the message audio file by a certain amount.

15. The system according to claim 14, wherein the processor is further configured to cause the first communication device to output a notification that transmission of the audio message is prevented.

16. The system according to claim 13, wherein the speaker information comprises at least one of the speaker identifiers and a speaker verification key.

17. The system according to claim 16, wherein the other information includes a digital signature or a media authentication code that is generated by the first communication device using the speaker verification key.

18. The system according to claim 13, wherein the processor is further configured to compress the secure text message prior to being transmitted from the first communication device.

19. The system according to claim 13, wherein the message audio file is transmitted along with the secure text message.

20. The system according to claim 13, further comprising a second communication device configured to:
receive the secure text message;
extract the speaker information or the other information from the secure text message; and
use the extracted speaker information or other information to verify an identity of the first individual.

21. The system according to claim 20, wherein the first individual's identity is verified by comparing the speaker information to the speaker information stored in the local memory of the second communication device so as to be associated with the message sets.

22. The system according to claim 20, wherein the first individual's identity is verified by determining whether the speaker information used to generate the other information matches the speaker information stored in the local memory of the second communication device so as to be associated with the message sets.

23. The system according to claim 20, wherein the second communication device is further configured to generate and output an alert from the second communication device when the first individual's identity is not verified.

24. The system according to claim 20, wherein the second communication device is further configured to use one of the message sets to reformulate the audio message.

\* \* \* \* \*